United States Patent
Abraham et al.

(10) Patent No.: US 12,121,932 B1
(45) Date of Patent: Oct. 22, 2024

(54) WHITE MOLECULAR ADSORBER COATING SYSTEM

(71) Applicant: U.S.A. as represented by the Administrator of the National Aeronautics and Space Administration, Washington, DC (US)

(72) Inventors: Nithin S. Abraham, Silver Spring, MD (US); Mark M. Hasegawa, Highland, MD (US); Sharon A. Straka, Glenelg, MD (US); John C. Petro, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 907 days.

(21) Appl. No.: 17/126,836

(22) Filed: Dec. 18, 2020

Related U.S. Application Data

(63) Continuation-in-part of application No. 14/502,260, filed on Sep. 30, 2014, now abandoned.

(60) Provisional application No. 63/107,573, filed on Oct. 30, 2020.

(51) Int. Cl.
| | |
|---|---|
| *B05D 7/00* | (2006.01) |
| *B05D 1/02* | (2006.01) |
| *B05D 3/02* | (2006.01) |
| *B05D 3/04* | (2006.01) |
| *B05D 3/14* | (2006.01) |
| *C09D 1/00* | (2006.01) |

(52) U.S. Cl.
CPC .............. *B05D 7/544* (2013.01); *B05D 1/02* (2013.01); *B05D 3/0272* (2013.01); *B05D 3/0406* (2013.01); *B05D 3/142* (2013.01); *C09D 1/00* (2013.01)

(58) Field of Classification Search
None
See application file for complete search history.

(56) References Cited

U.S. PATENT DOCUMENTS

2012/0034384 A1\* 2/2012 Straka .................. C09D 1/00
427/372.2

\* cited by examiner

*Primary Examiner* — Michael P. Rodriguez
(74) *Attorney, Agent, or Firm* — Derek J. Langdon; Matthew F. Johnston; Trenton J. Roche

(57) ABSTRACT

A method of coating a substrate with a white molecular coating. A colloidal based primer is prepared having on a mass basis between 30-40% suspensions of fine-sized spherical particles of nonporous silica dispersed in liquid phase. The primer is applied to the substrate and allowed to dry. A molecular adsorber coating is prepared by treating a zeolite with a colloidal silica binder thereby providing a treated pigment having a mass ratio of the colloidal silica to the zeolite is in a range of 2.0 to 2.6, then processing the treated pigment into a powder thereby facilitating sprayability and then mixing said treated zeolite with a colloidal solution containing silica. The coating is then sprayed onto the primer and allowed to dry. The resultant coating provides adequate bond stability and strength necessary for flight applications within an environment for vacuum of space applications.

11 Claims, 6 Drawing Sheets

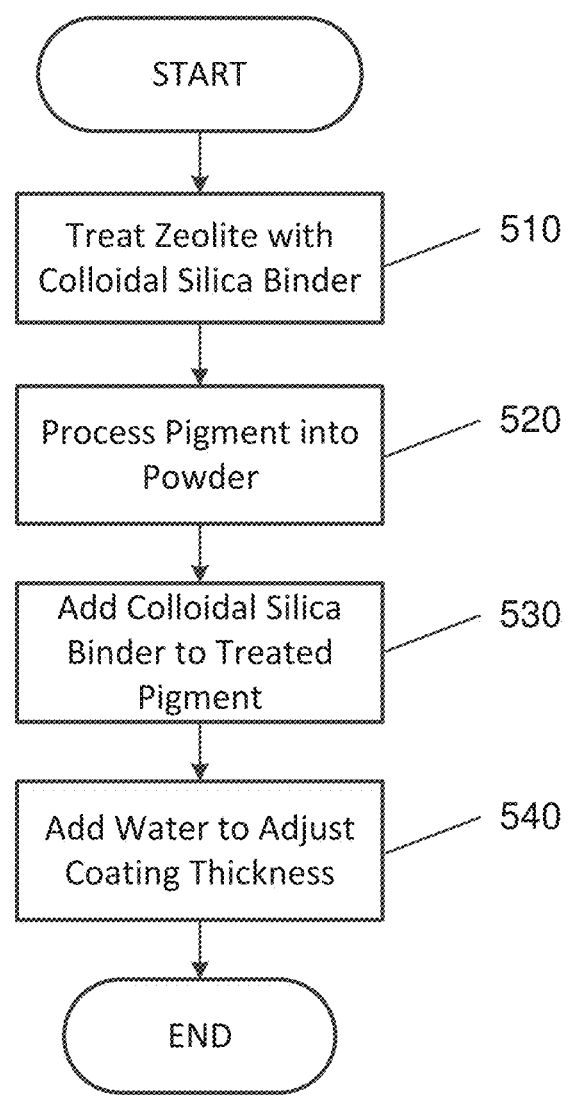

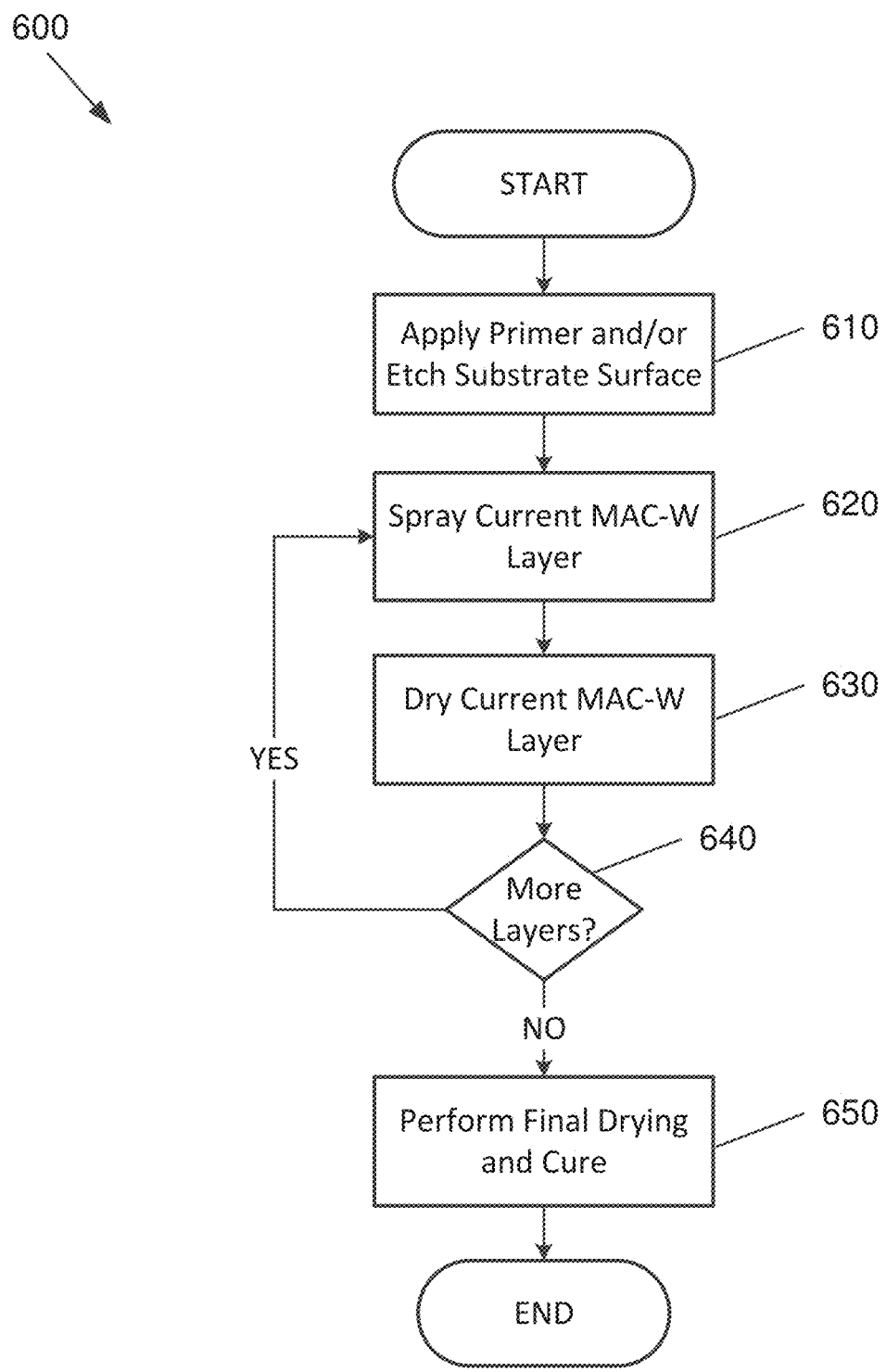

WHITE MOLECULAR ADSORBER COATING SYSTEM

PRIORITY

This is a Continuation-in-Part Application of U.S. application Ser. No. 14/502,260 entitled "WHITE MOLECULAR ADSORBER COATING SYSTEM" filed on Sep. 30, 2014 and is herein incorporated by reference in its entirely. The present application also claims the benefit of provisional application 63/107,573 entitled "IMPROVED WHITE MOLECULAR ADSORBER COATING SYSTEM" filed on Oct. 30, 2020 and is herein incorporated by reference in its entirely.

ORIGIN OF THE INVENTION

The invention described herein was made by employees of the United States Government, and may be manufactured and used by or for the Government for Government purposes without the payment of any royalties thereon or therefore.

FIELD

The present invention generally pertains to coatings, and more specifically, to a sprayable zeolite-based molecular adsorber coating system.

BACKGROUND

The need to control adverse on-orbit molecular contamination is becoming increasingly important as performance requirements on instruments and spacecraft subsystems become more advanced. Traditionally, zeolite based molecular adsorbers have been used in spacecraft and instruments to collect and retain outgassed molecular effluent emanating from potting compounds, epoxies, tapes, lubricants, and other spacecraft materials, protecting critical contamination-sensitive surfaces and significantly reducing material restrictions and bake-out durations. Uncontrolled, molecular contamination can cause significant degradation of instrument performance, thermal control properties, solar array efficiency, optical surfaces, laser systems, detectors, cryogenic instruments, and high powered electronics. Puck type adsorbers have been used in the past, but these adsorbers have certain drawbacks, including additional weight, size, and mounting requirements. Accordingly, an improved adsorber coating system may be beneficial.

SUMMARY

Certain embodiments of the present invention may be implemented and provide solutions to the problems and needs in the art that have not yet been fully solved by conventional adsorber coating systems. For instance, in some embodiments, a sprayable white molecular adsorber coating (MAC-W) system includes zeolite, binder, water, and an epoxy-based primer or a colloidal-based primer. Such embodiments may be applied to a wider range of surfaces and exhibit superior molecular contaminant trapping properties to conventional adsorber systems.

In one embodiment of the present invention, a coating system includes a molecular adsorber coating including zeolite, binder, and water. The coating system also includes an epoxy-based or colloidal-based primer applied to a surface of a substrate. The primer is configured to adhere the coating to the surface of the substrate.

In another embodiment of the present invention, a coating system includes a molecular adsorber coating including zeolite, binder, and water. The coating system also includes a substrate comprising an abraded surface. The coating adheres to the abraded surface of the substrate.

In yet another embodiment of the present invention, a method includes treating zeolite with a binder to create a pigment and processing the pigment into a powder. The method also includes adding water to the pigment to adjust a thickness of a resultant coating.

The following is a terse description of a portion of the method steps according to an embodiment of the present invention. 1. Measure out solid zeolite powder. 2. Add liquid colloidal binder to the zeolite powder at a mass ratio of 2.4. 3. Dry the combined zeolite and binder mixture in an oven to remove all water at 212 F overnight. 4. Crush the dried up zeolite and binder mixture into powder form using a blender to get it in a rough powder. At least a couple of minutes in the blender. 5. Further process the crushed up mixture using a ball mill jar and media set, the resulting fine powder is called the treated pigment; (usually 4 to 8 hours depending on the desired powder size and media fill). 6. Mix this treated pigment with more colloidal binder to create a wet coating at a mass ratio of 1.2 or 1.4. 7. Blend the treated pigment in a ball mill jar and media set until the liquid coating reaches a uniform consistency (at least 1 hour). 8. Pour the wet mixture into a spray gun volume. 9. Spray the first coat of MAC-W to a properly surface prepped, primed or rub primed surface.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is a flowchart illustrating a process for creating MAC-W, according to an embodiment of the present invention.

FIG. 6 is a flowchart illustrating a process for applying one or more layers of MAC-W to a substrate, according to an embodiment of the present invention.

DETAILED DESCRIPTION OF THE EMBODIMENTS

Figure 1:
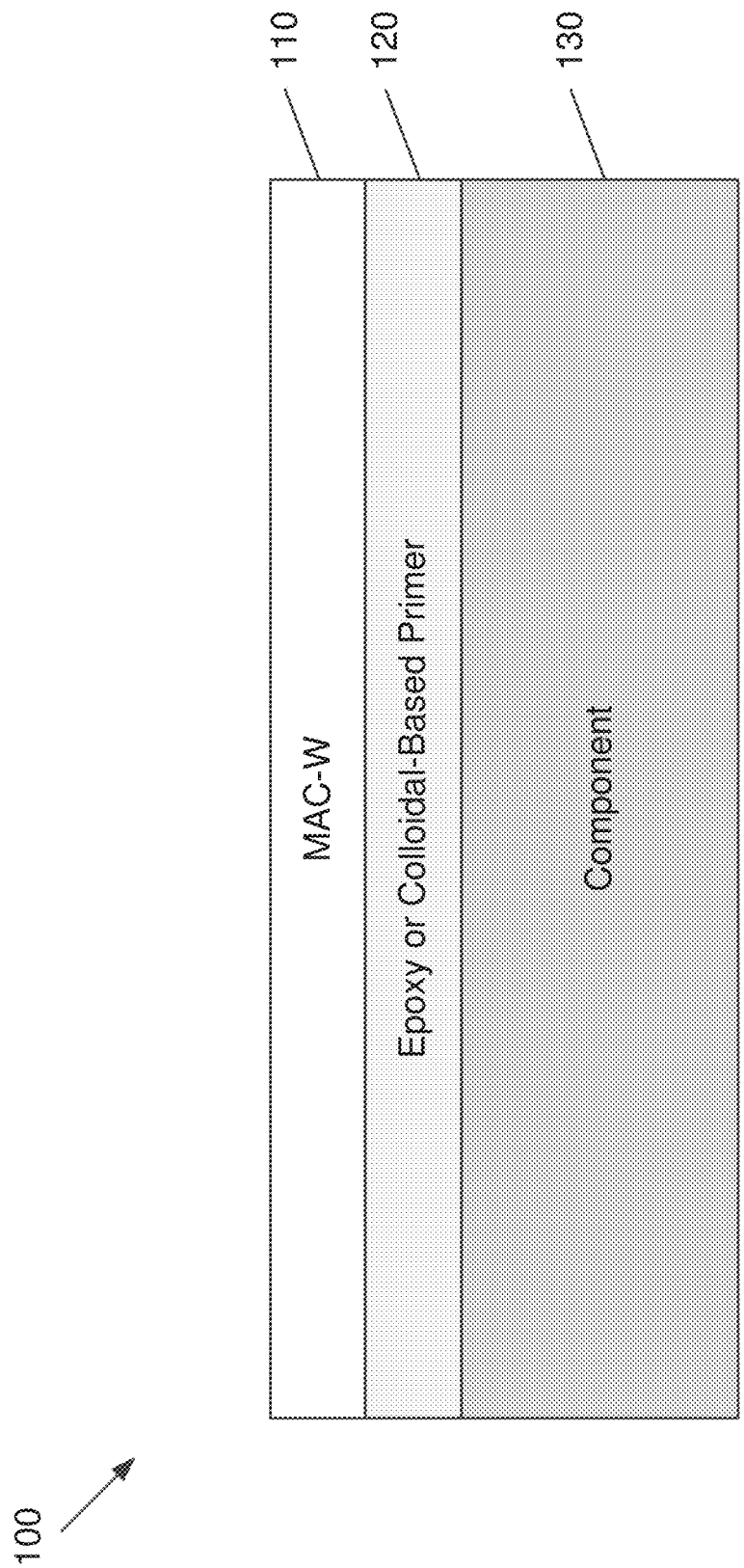
FIG. 1 is aside view illustrating MAC-W applied to a substrate via an epoxy-based or colloidal-based primer, according to an embodiment of the present invention.

Some embodiments of the present invention pertain to a sprayable zeolite-based molecular adsorber coating system.

In an effort to simplify previously flown complex zeolite coated cordierite molecular adsorber systems, such as those flown on the Swift Gamma Ray Burst Mission, Hubble Space Telescope (HST), Tropical Rainfall Measuring Mission (TRMM) (bus vent), and GOES Extreme Ultraviolet instruments, Goddard Space Flight Center developed a new, improved white molecular adsorber coating. The molecular adsorber coating was developed to adsorb outgassed or offgassed chemical constituents from common spaceflight materials including, but not limited to, hydrocarbons. This sprayable coating may eliminate the major drawbacks of puck type adsorbers (e.g., weight, size, and mounting hardware requirements), resulting in cost savings, mass savings, easier utilization, greater adsorber surface area, more flexibility, and higher efficiency. These new coatings are extremely porous on a microscopic level. This microscopic nano-textured structure, including large open pores or cavities within a crystal-like structure, provides a large surface area-to-mass ratio that increases available trapping efficiency.

Such formulations of white molecular adsorber paint (MAC-W) display improved adsorption characteristics over previous GSFC molecular adsorber coating formulations. In addition, the MAC-W exhibits excellent adhesion to multiple substrates including, but not limited to, composites, cellulose based materials, aluminum, titanium and other metals. Previous formulations were limited to aluminum substrates. Some embodiments of this new coating may also be applied to flexible surfaces.

Furthermore, the MAC-W coating formulation may provide for an improved and more efficient spray application process. Samples were spray coated and tested for capacity, thermal optical/radiative properties, vacuum resistivity, coating adhesion, acoustic testing, thermal cycling in a vacuum, thermal shock, desorbtion, reflectivity, and emissivity. In testing, it was demonstrated that the coating formulations have good bond stability and strength necessary for flight applications between −40° C. to 70° C. from vacuum thermal cycle testing and between −190° C. to 125° C. from air thermal shock testing. Moreover, there has been successful testing of MAC-W at wide vacuum range for specific applications; e.g. ~7 Torr for Mars environment applications to ~10-7 Torr for vacuum of space applications. It was also demonstrated that the coating has excellent vacuum stability.

The thermal optical properties were characterized as a function of coating thickness and surface finish. Acoustic testing showed minimal particle generation, which verifies coating adhesion performance. Capacitance was between 0.6 and 4.8 mg/cm2 for coating thicknesses between 2.5 mils and 10.5 mils, respectively. Work performed during this development indicates that the molecular adsorber formulation can be applied to any substrate that can accept an epoxy system or colloidal silica system. The coating can also function as a thermal control coating in a space environment. Testing various contaminants for capacitance has been shown to effectively adsorb long chain hydrocarbons, plasticizers, silicones, and similar compounds.

Embodiments are not limited to aerospace applications, however. Some embodiments may be used for ground-based applications, such as in areas where contaminants and volatile emissions need to be collected and contained. Example applications include, but are not limited to, pharmaceutical production, food processing, electronics manufacturing (e.g., circuit boards and wafers), laser manufacturing, vacuum systems, chemical processing, and general gas and water adsorption. The coating in many embodiments works in vacuum systems, as well as air, depending upon the application.

MAC-W may perform as a thermal control coating with favorable thermal emittance properties and as a contamination mitigation tool with adsorbing properties for outgassing materials. Some embodiments of MAC-W may be advantageous for reducing subsystem hardware bake-outs, reducing detector cycling, preventing high voltage arcing, eliminating costly material selections, and lengthening mission operations. Some embodiments of MAC-W may be used, for example, on the inside and/or outside of electronics boxes, on internal instrument surfaces and baffles, and on internal structural walls of spacecraft buses. MAC-W contains no organics or only traces of organics in some embodiments.

This coating may cause no additional outgassing, and may work in vacuum systems and air alike, depending upon the application. For aerospace applications, the coating of some embodiments could be applied to exterior and interior surfaces on missions with contamination sensitive instruments and/or spacecraft systems in order to prevent science degradation due to contamination. This has the potential to extend the life of some instruments and/or spacecraft systems. Additionally, the inside of electronics boxes could be painted with this coating, eliminating or reducing the need for electronics box bake-outs, resulting in cost and schedule savings.

Figure 2:
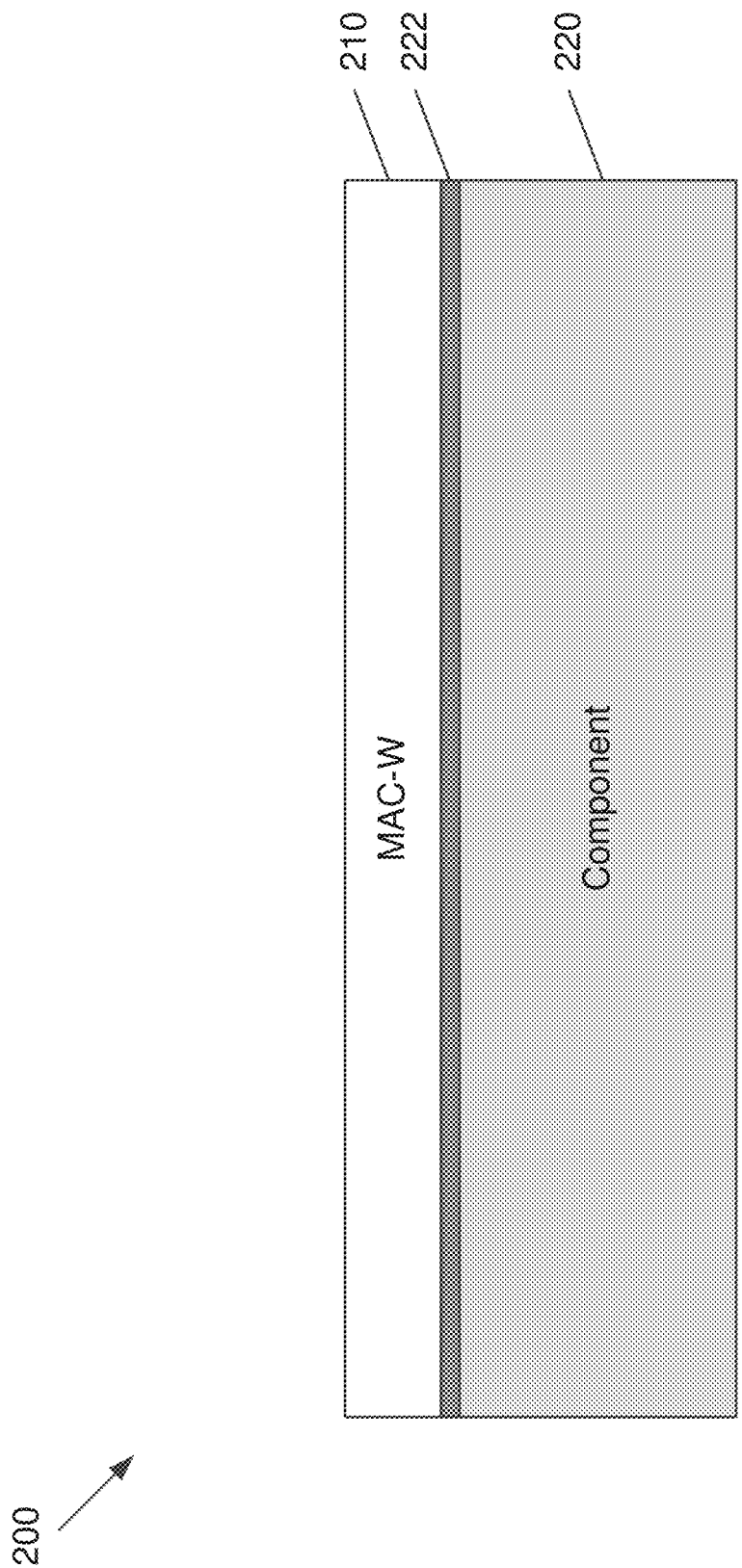
FIG. 2 is aside view illustrating MAC-W applied to an abraded surface of a substrate, according to an embodiment of the present invention.
Figure 3:
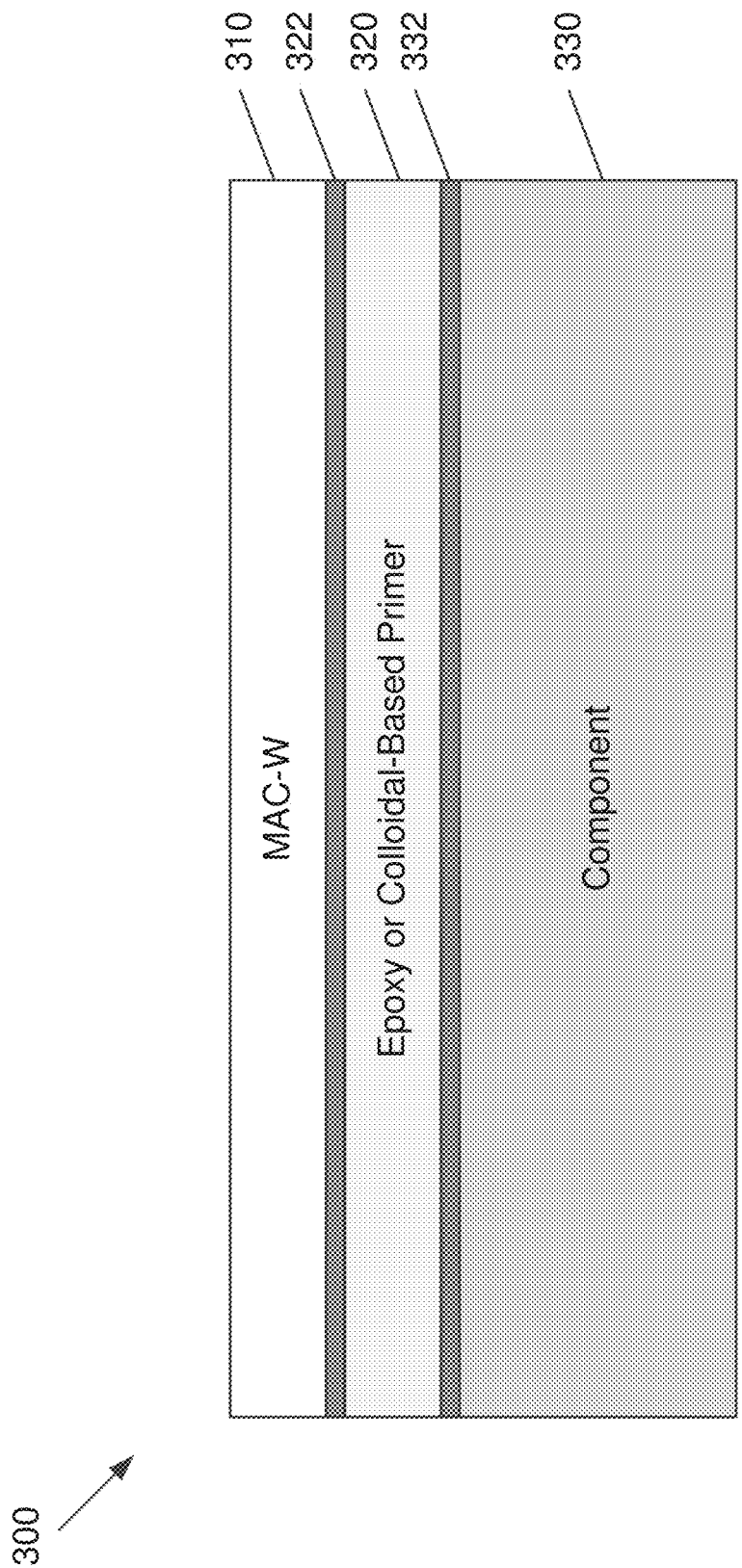
FIG. 3 is a side view illustrating MAC-W applied to a substrate via primer deposited on an abraded substrate surface, according to an embodiment of the present invention.

The molecular adsorber coating system may include zeolite, binder, water, and an epoxy based primer or a colloidal based primer in some embodiments, although other constituents may or may not be present. Such a primer may improve adhesion of the coating to the underlying substrate. FIG. 1 is a side view 100 illustrating MAC-W 110 applied to a substrate 130 via an epoxy-based or colloidal-based primer 120, according to an embodiment of the present invention. As would be understood by one of ordinary skill in the art, the substrates and layers of FIGS. 1-3 are not drawn to scale, but are for illustrative purposes only. MAC-W 110 includes zeolite. The zeolite functions as a molecular sieve to capture and trap contaminants. The zeolite may be virtually any type of zeolite in some embodiments. In some embodiments, the zeolite may be an aluminosilicate type of zeolite for example 13× molecular sieve among other possibilities.

In MAC-W 110, the zeolite may be treated with a colloidal silica binder to provide a pigment that is compatible with the binder. The mass ratio of colloidal silica to zeolite may be in the range of 2.0 to 2.6 in some embodiments. The treated pigment is then processed to a fine powder to improve sprayability, an essential step in the method of the present invention. The mass fraction of treated zeolite in the molecular adsorber coating may be in a range of 0.4 to 0.6 in some embodiments. The zeolite particles are mixed with a colloidal solution containing silica. This wet mixture is placed in the oven to evaporate the water. Afterwards, the remaining colloidal silica surrounds the zeolite particles. This dried product is then ground, and ball milled into a powder form and then, separated into different sized particle sizes. The distribution of particle sizes for the treated pigment provides increased surface roughness to the coating, which improves adsorption properties.

The binder functions as glue that holds MAC-W 110 together. The binder may be, for example, various grades of Ludox™ colloidal silica-based binders. For instance, Ludox™ grades AS-30, AS-40, AM, and/or HS-40 may be used. However, any suitable binder may be used. The binder may contain, on a mass basis, between 30-40% suspensions of fine-sized spherical particles of nonporous silica dispersed in liquid phase in some embodiments. Other silicate-based binders may also be used. The mass fraction of binder in the molecular adsorber coating may be in a range of 0.4 to 0.6 in some embodiments. However, use of the binder as described in the previous paragraph for mixing it with the treated pigment has been shown to create a particularly strong silica to silica bond. This has demonstrated to significantly improve adhesion of MAC-W coating.

The water component of MAC-W 110 may function to adjust the thickness of the coating. The thickness of MAC-W 110 may be adjusted so that the coating may be used in a spray application process. Water may or may not be used, depending on the application. The mass fraction of water in MAC-W 110 may be in a range of 0 to 0.3 in some embodiments. The mass fractions of these three components in MAC-W 110 may vary depending on the desired mass ratio of binder to treated zeolite. In some embodiments, the mass ratio of binder to treated zeolite may be in a range of 1.0 to 1.6.

MAC-W 110 may be applied by a standard spray application process. Any suitable type of surface may be treated with MAC-W 110. The surface to be treated, e.g., a top surface of substrate 130, may be prepared for bonding with MAC-W 110 by applying a primer to the surface or by abrading the surface (described below with respect to FIG. 2). The primer may be MLP-300-AZ by AZ Technology™ in some embodiments. However, any suitable primer may be used. Before applying MAC-W 110 in this embodiment, epoxy-based primer or a colloidal-based primer 120 is applied to substrate 130, depending on the type of substrate 130, to increase adhesion of MAC-W 110 to substrate 130.

FIG. 2 is a side view 200 illustrating MAC-W 210 applied to an abraded surface 222 of a substrate 220, according to an embodiment of the present invention. Rather than using a primer as in FIG. 1, a surface 222 of substrate 220 is abraded. This improves adhesion of MAC-W 210 to surface 222 of substrate 220.

Abrading involves the process of "roughening up" the substrate, which is a surface preparation technique. This may be achieved by using sand paper, a sanding/grinding tool, a grit or bead blaster, oxygen plasma etching, or any other suitable approach. The use of energetic oxygen plasma will reduce and remove the organic material coverage of the contacting surface between the MAC-W and the silica filler within the primer. By doing so, a greater portion of the MAC-W silica binder will bond to the silica filler within the primer; thereby increasing the bond strength of the MAC-W to the primer. This energetic oxygen plasma can be performed in a vacuum chamber operating at oxygen pressures between 1E-3 and 1E-5 torr and with a 2-4 KW DC power source for 10 minutes to greater than 2 hours. Similarly, mechanical means of etching or roughening the primer surface will increase the physical contact area between the MAC-W binder and the active primer bonding sites and can be performed prior to or after primer cure has completed. The applied primer may also be abraded prior to application of the MAC-W layer.

FIG. 3 is a side view 300 illustrating MAC-W 310 applied to a substrate 330 via primer 320 deposited on an abraded substrate surface 332, according to an embodiment of the present invention. A surface 322 of primer 320 is also abraded in this embodiment. In FIG. 3, surface 332 of substrate 330 is abraded. Primer 320 is then deposited on abraded substrate surface 332, and a surface of primer 320 is abraded to form abraded primer surface 322. MAC-W 310 is then applied to abraded primer surface 322.

In some embodiments, MAC-W 110 may be sprayed onto the surface to be treated in multiple layers. This may improve adsorption of contaminants. Based on testing, it appears the thicker the coating that is applied, the greater the adsorption capability. This may be due to the diffusion of the contaminants down through the pores of the coating layers over time.

Figure 4:
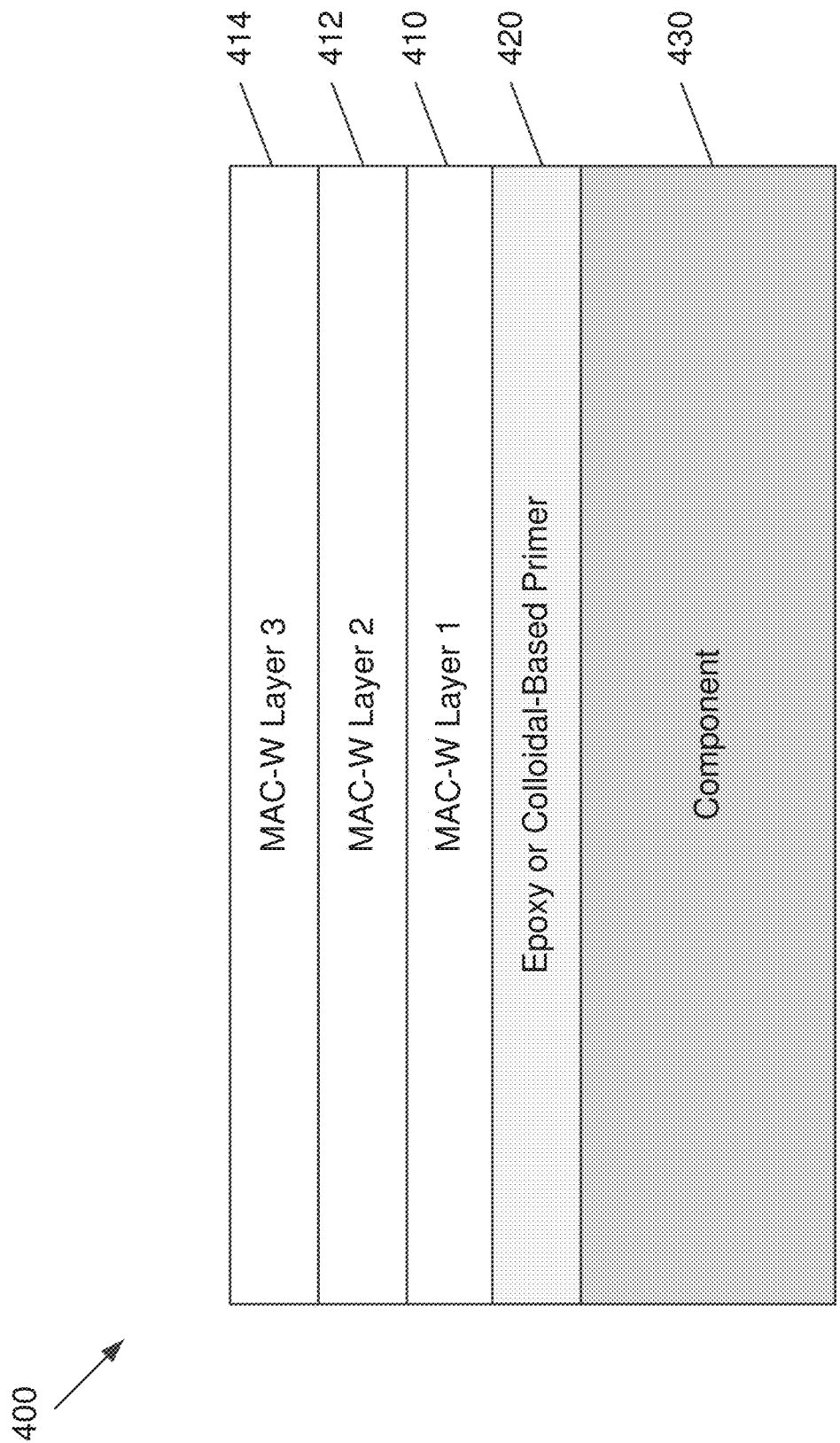
FIG. 4 is a side view illustrating three MAC-W layers applied to a substrate via an epoxy-based or colloidal-based primer, according to an embodiment of the present invention.

FIG. 4 is a side view 400 illustrating three MAC-W layers 410, 412, 414 applied to a substrate 430 via an epoxy-based or colloidal-based primer 420, according to an embodiment of the present invention. However, any desired number of layers may be used. Also, in some embodiments, the surface of substrate 430 may be abraded in addition to or in lieu of using epoxy or colloidal-based primer 420. In certain embodiments a surface of primer 320 may be abraded. In this embodiment, layer 410 is applied and dried, then layer, 412, followed by layer 414.

After each layer 410, 412, 414 of MAC-W is applied, the surface of the respective layer may be air-dried until the water component of the MAC-W evaporates from the coated surface and the coated surface appears to have a matte-like finish. The coated surface may be placed in an oven and baked between 150-250° F. in some embodiments for intermediate drying. After all layers are applied, the final coated surface, in this case, that of layer 414, may be placed in the oven for final drying and cure. In some embodiments, this may be at least two hours, for example, to flash off water. The ultimate drying and cure time in the oven or in air may vary, depending on the application.

FIG. 5 is a flowchart illustrating a process 500 for creating MAC-W, according to an embodiment of the present invention. The process begins with treating zeolite with a colloidal silica at 510 to create a pigment that is compatible with the binder. Next, the pigment is processed into a fine powder at 520 to improve sprayability. The resultant powder is the "treated pigment" that is made from the dried out contents of the zeolite treated with colloidal silica binder with a desired mass ratio. Colloidal silica binder is added to the treated pigment at 530. Finally, water is added at 540 to adjust the thickness of the MAC-W.

FIG. 6 is a flowchart illustrating a process 600 for applying one or more layers of MAC-W to a substrate, according to an embodiment of the present invention. The process begins with applying primer to and/or abrading the substrate surface at 610. Next, a current layer of MAC-W is sprayed onto the primer, abraded surface, or previous MAC-W layer, depending on the iteration, at 620. The current MAC-W layer is then dried at 630. In some embodiments, the current layer may be air dried and/or baked in an oven to evaporate the water component of the MAC-W.

After the current layer is dried at 630, if there are additional layers to apply at 640, the process repeats beginning at step 620 for the next layer. If all layers have been applied at 640, final drying and cure is performed at 650. In some embodiments, this may be at least two hours, for example, to flash off water. The ultimate drying and cure time in the oven or in air may vary, depending on the application.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method of coating a substrate with a white molecular coating, said method comprising:
   providing said substrate;
   abrading said substrate;
   providing a colloidal based primer;
   applying said colloidal based primer to said abraded substrate and allowing said primer to dry;
   preparing a molecular adsorber coating, wherein preparing the molecular adsorber coating further comprises:
      mixing zeolite with a colloidal solution containing silica;
      processing the mixture of zeolite and colloidal solution containing silica to form a treated pigment, wherein the treated pigment is in a powder form;
      mixing the treated pigment with a colloidal silica-based binder to form the molecular adsorber coating; and
   spraying at least one coat of said molecular adsorber coating to said primer and allowing said molecular adsorber coating to dry; whereby said molecular adsorber coating being spray coated to said primer provides adequate bond stability and strength necessary for flight applications within an environment of between $-40°$ C. to $70°$ C. vacuum thermal cycle testing, between $-190°$ C. to $125°$ C. during air thermal shock testing and 10-7 Torr for vacuum of space applications.

2. The method according to claim 1, wherein after said step of applying said colloidal based primer to said abraded substrate, abrading said primer by performing energetic oxygen plasma in a vacuum chamber operating at oxygen pressures between 1E-3 and 1E-5 torr and with a 2-4 KW DC power source for between 10 minutes to 2 hours.

3. A method of coating a substrate with a white molecular coating, said method comprising:
   providing said substrate;
   abrading said substrate;
   providing an epoxy based primer to said abraded substrate and allowing said primer to dry;
   preparing a molecular adsorber coating, wherein preparing the molecular adsorber coating further comprises:
      mixing zeolite with a colloidal solution containing silica;
      processing the mixture of zeolite and colloidal solution containing silica to form a treated pigment, wherein the treated pigment is in a powder form;
      mixing the treated pigment with a colloidal silica-based binder to form the molecular adsorber coating; and
   spraying at least one coat of said molecular adsorber coating to said abraded primer and allowing said molecular adsorber coating to dry; whereby said molecular adsorber coating being spray coated to said primer provides adequate bond stability and strength necessary for flight applications within an environment of between $-40°$ C. to $70°$ C. vacuum thermal cycle testing, between $-190°$ C. to $125°$ C. during air thermal shock testing and 10-7 Torr for vacuum of space applications.

4. The method according to claim 3, wherein after said step of applying said epoxy based primer to said abraded substrate, abrading said primer by performing energetic oxygen plasma in a vacuum chamber operating at oxygen pressures between 1E-3 and 1E-5 torr and with a 2-4 KW DC power source for between 10 minutes to 2 hours.

5. The method according to claim 1, wherein the treated pigment has a mass ratio of the colloidal silica to the zeolite is in a range of 2.0 to 2.6.

6. The method according to claim 1, wherein the molecular adsorber coating has a mass ratio of the colloidal silica-based binder to the treated pigment is in a range of 1.0 to 1.6.

7. The method according to claim 1, wherein the colloidal silica-based binder has, on a mass basis, between 30-40% suspensions of fine-sized spherical particles of nonporous silica dispersed in liquid phase.

8. The method according to claim 1, wherein the colloidal solution containing silica and the colloidal silica-based binder are the same solution.

9. The method according to claim 1, wherein the step of preparing the molecular adsorber further comprises adding water to the mixture of the treated pigment and the colloidal silica-based binder.

10. The method according to claim 1, wherein the step of processing the mixture of zeolite and colloidal solution containing silica includes placing the mixture in an oven to evaporate the water and milling the mixture in a ball mill to form a fine powder.

11. The method according to claim 1, wherein the step of abrading said substrate is by performing oxygen plasma etching using energetic oxygen plasma in a vacuum chamber operating at oxygen pressures between 1E-3 and 1E-5 torr and with a 2-4 KW DC power source for between 10 minutes to 2 hours.

\* \* \* \* \*